United States Patent
Fan

(10) Patent No.: US 7,767,324 B2
(45) Date of Patent: Aug. 3, 2010

(54) DIRECT METHANOL FUEL CELL ELECTRODE CATALYST

(75) Inventor: Qinbai Fan, Chicago, IL (US)

(73) Assignee: Gas Technology Institute, Des Plaines, IL (US)

(*) Notice: Subject to any disclaimer, the term of this patent is extended or adjusted under 35 U.S.C. 154(b) by 1671 days.

(21) Appl. No.: 10/642,852

(22) Filed: Aug. 18, 2003

(65) Prior Publication Data

US 2004/0224218 A1  Nov. 11, 2004

Related U.S. Application Data

(60) Provisional application No. 60/468,324, filed on May 6, 2003.

(51) Int. Cl.
  H01M 8/00  (2006.01)
  H01M 4/96  (2006.01)
  H01M 4/86  (2006.01)
  H01M 4/92  (2006.01)

(52) U.S. Cl. .............. 429/12; 429/27; 429/40; 429/44

(58) Field of Classification Search .......... 429/12, 429/42, 27, 40, 44
See application file for complete search history.

(56) References Cited

U.S. PATENT DOCUMENTS

| 5,573,866 A | 11/1996 | Van Dine et al. |
| 6,380,126 B1 | 4/2002 | Finkelshtain et al. |
| 6,479,181 B2 | 11/2002 | Finkelshtain et al. |
| 2002/0183470 A1* | 12/2002 | Tripathy et al. .............. 526/217 |
| 2003/0008199 A1 | 1/2003 | Finkelshtain et al. |
| 2004/0110051 A1* | 6/2004 | Srinivas ........................ 429/33 |

OTHER PUBLICATIONS

Stein Jess, The Random House College Dictionary 1975, Random House, Inc., 1st Edition, Section L.*
http://www.sigmaaldrich.com/aldrich/bulletin/al_ms_app_catalog_fuelcell.pdf, p. 153.*

* cited by examiner

Primary Examiner—Helen O Conley
(74) Attorney, Agent, or Firm—Mark E. Fejer

(57) ABSTRACT

A method and device for reducing or substantially eliminating methanol crossover from the anode to the cathode of a direct methanol fuel cell and for increasing catalyst efficiency in which a catalyst ink layer comprising an electron conductive and proton conductive binder material is applied either to the anode electrode or the electrolyte layer of the direct methanol fuel cell.

15 Claims, 5 Drawing Sheets

DIRECT METHANOL FUEL CELL ELECTRODE CATALYST

CROSS-REFERENCE TO RELATED APPLICATION

This application claims the benefit of an earlier filed provisional application having Ser. No. 60/468,324 and a Filing Date of 6 May 2003.

BACKGROUND OF THE INVENTION

1. Field of the Invention

This invention relates to electrochemical devices, more particularly to electrochemical devices in which a carbonaceous material undergoes oxidation to produce chemicals and/or electricity. This invention also relates to a method for substantially preventing the crossover of some of the carbonaceous material from one side of the electrolyte through the electrolyte to the other side of the electrolyte of the electrochemical devices. More particularly, this invention relates to direct methanol fuel cells and direct methanol fuel cell anode electrode catalysts, which are both proton and electron conductive and which reduce methanol crossover, a common problem in direct methanol fuel cells.

2. Description of Related Art

An electrochemical device is a device in which a chemical or chemical compound is modified by electronic means to produce other chemicals and/or electricity. Exemplary of devices which produce electricity are fuel cells, which comprise an anode electrode, a cathode electrode and an electrolyte disposed between the anode electrode and the cathode electrode, in which a fuel such as hydrogen or carbonaceous materials such as methane, methanol, ethane, butane, etc. is introduced into the anode side of the electrolyte and an oxidant, such as air, is introduced into the cathode side of the electrolyte and the fuel and oxidant are reacted, resulting in the generation of electricity. Typically, the carbonaceous fuels are first reformed to produce hydrogen, which is then introduced into the fuel cell. However, it will be apparent that fuel cells which are capable of direct utilization of carbonaceous fuels are a desirable objective since the need for reforming would be eliminated.

There exist different types of fuel cells defined, in part, on the basis of the type of electrolyte employed. Molten carbonate fuel cells employ molten carbonates disposed in an electrolyte matrix as an electrolyte; phosphoric acid fuel cells employ phosphoric acid as an electrolyte; solid oxide fuel cells employ solid oxide electrolytes; and polymer electrolyte membrane fuel cells (also referred to as proton exchange membrane fuel cells) employ, as the name suggests, polymeric membranes as an electrolyte.

Direct methanol polymer electrolyte membrane fuel cells are prime candidates for both vehicular and stationary uses due to their inherent simplicity (no external reformers) and potential high energy densities (liquid fuels). In addition, direct methanol polymer electrolyte membrane fuel cells have the potential for replacing rechargeable batteries due to the possibility of a zero recharge time. However, the current state of the art in direct methanol polymer electrolyte membrane fuel cells requires external means, such as pumps and blowers for introducing reactants into and removing reaction products from the fuel cell. For example, U.S. Pat. No. 5,573,866 to Van Dine et al. teaches a polymer electrolyte membrane fuel cell which directly oxidizes liquid methanol fuel that is fed into the anode chamber from a liquid methanol storage container. The liquid methanol is mixed with water in the anode chamber. Some of the methanol and water cross over the membrane into the cathode chamber and into a process air stream. The methanol and water are removed from the cathode chamber by evaporation into the process air stream, which is then directed into a condenser/radiator. The methanol and water vapors are condensed in the condenser/radiator, from whence the condensed water and methanol are returned to the anode chamber of the cell. The evaporating cathode process air stream, which is provided to the cathode chamber by means of a fan, provides oxygen for the fuel cell reaction, and also cools the cell.

Direct methanol fuel cells (DMFCs) are currently being investigated for a number of different applications from milliwatt to kilowatt scale. The most common obstacles are the lack of catalyst activity at the anode and the inability of the membrane electrolyte to be an effective methanol barrier. Numerous concepts have been promoted for reducing methanol crossover from the anode to the cathode. These include (1) increasing membrane thickness, which disadvantageously increases the internal resistance of the cell, (2) modifying the existing membrane with organic or inorganic materials to form a physical obstacle to hinder methanol crossover, which disadvantageously jeopardizes the performance or stability of the membrane, and (3) finding new polymers that provide high proton conductivity and low methanol crossover, which to date has not been achieved.

SUMMARY OF THE INVENTION

It is, thus, one object of this invention to provide a method for reducing fuel crossover from the anode to the cathode in a direct-fuel type fuel cell.

It is one object of this invention to provide a method for reducing methanol crossover in a direct methanol fuel cell without reducing proton conductivity.

The invention claimed herein is an electrochemical device or fuel cell comprising an electrolyte having an anode side and a cathode side, at least one consumable carbonaceous material disposed on the anode side, and crossover means for reducing crossover of the at least one consumable carbonaceous material through the electrolyte to the cathode side. Although discussed herein in the context of a direct methanol fuel cell (DMFC), it will be apparent to those skilled in the art that this invention is applicable to other types of fuel cells and such other fuel cell applications are deemed to be within the scope of this invention. Conventionally, the electrodes are gas diffusion electrodes bonded or applied on either side of a solid polymer electrolyte membrane to produce a membrane/electrode assembly (MEA). Disposed between the electrodes and the solid polymer electrolyte membrane is a catalyst layer, which may be applied as an ink layer to the electrode or the polymer electrolyte membrane.

The invention claimed herein comprises a modification to the anode catalyst ink layer to increase electron and proton conduction within the device and to reduce methanol transport. Methanol molecules are hindered or prevented from passing through the modified catalyst layer, thereby reducing or eliminating methanol reach into or crossover through the polymer electrolyte membrane. The anode catalyst layer is modified by the dispersal of a binder material throughout the layer comprising an electronically conductive material, a proton conductive material, and lignin. In accordance with one preferred embodiment of this invention, the binder material is polyaniline ink, which is a long chain, grafted to lignin. Advantages of this ink in accordance with one embodiment of this invention include (1) the use of ligno-sulfonic acid and para-toluene sulfonic acid as dopants where the sulfonic acid in the polymer enables proton conductivity; (2) the use of polyaniline, which is a good electron conductor and which enables the electrons resulting from the oxidation of methanol to transfer to the external circuit; (3) corrosion resistance and adhesiveness, which add to stable bonding of the layer; (4) stability under oxidation and reduction conditions because the ink contains a grafted polymer; and (5) improvement in the overall catalytic efficiency because the ink is both electron and proton conductive, thereby reducing the restriction on the transport of the methanol reaction products, such as protons through the electrolyte membrane and electrons to the external circuit.

DETAILED DESCRIPTION OF THE PRESENTLY PREFERRED EMBODIMENTS

As used herein, the term "polymer" generally includes, but is not limited to, homopolymers, copolymers, such as for example, block, graft, random and alternating copolymers, terpolymers, etc., and blends and modifications thereof. In addition, unless otherwise specifically limited, the term "polymer" also includes all possible geometric configurations of the molecule including, but not limited to, isotactic, syndiotactic, atactic and random symmetries.

Figure 1:
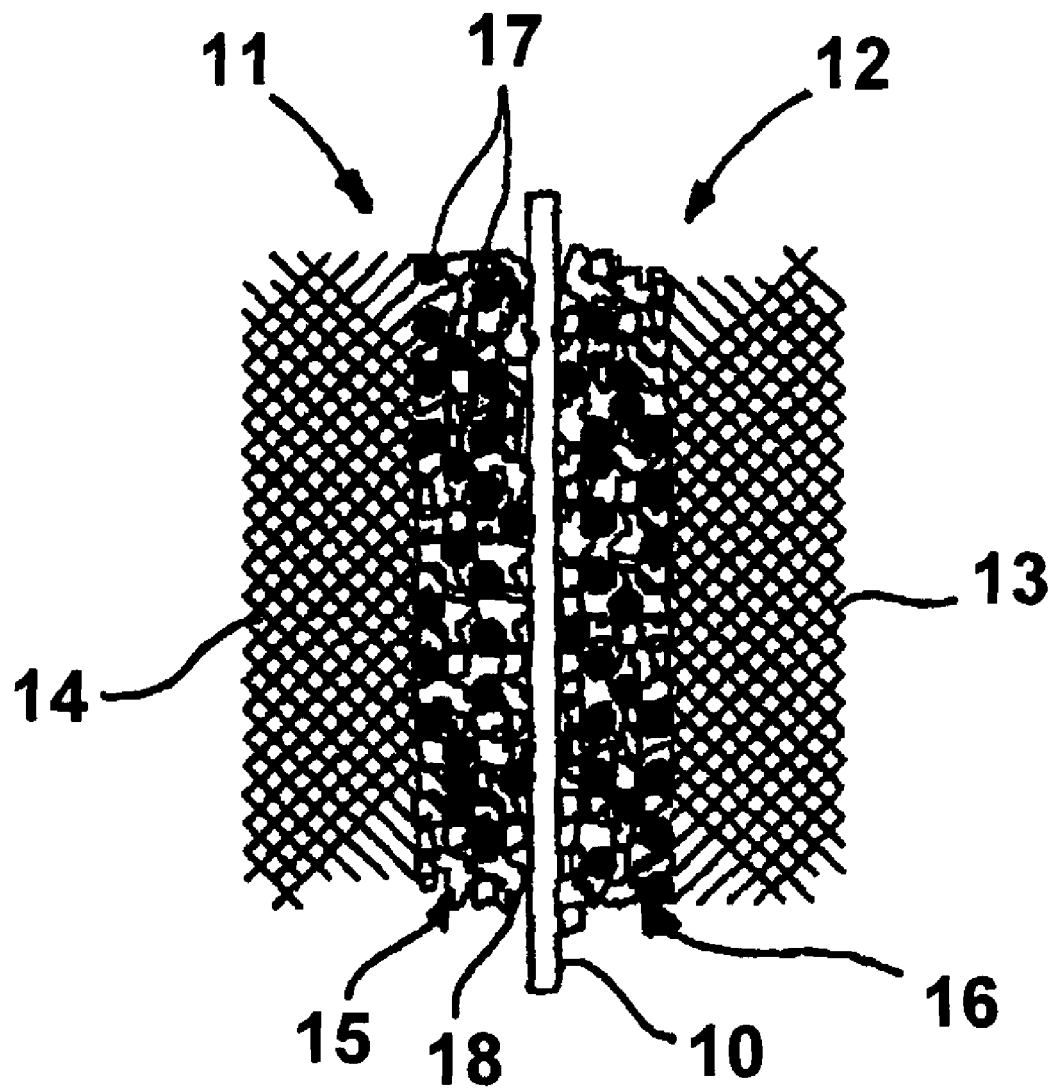
FIG. 1 is a schematic diagram of a membrane electrode assembly of a polymer electrolyte membrane fuel cell.

In a conventional polymer electrolyte membrane fuel cell, the electrolyte 10 is a solid polymer membrane disposed between the anode electrode 11 and the cathode electrode 12, as shown in FIG. 1. The electrodes comprise a current collector/gas diffusion layer 13,14, which may be made of carbon cloth, and disposed between the gas diffusion layers 13, 14 and the solid polymer electrolyte membrane 10 is a catalyst layer 15, 16 which may be applied directly on the gas diffusion layer or on the solid polymer membrane. The catalyst layer 15, 16, typically applied as a catalyst ink, is typically constructed of a plurality of catalyst particles 17 bound together by a binder material 18, typically NAFION, a sulfonated tetrafluoroethylene copolymer, which is proton conductive but not electronically conductive.

Figure 2A:
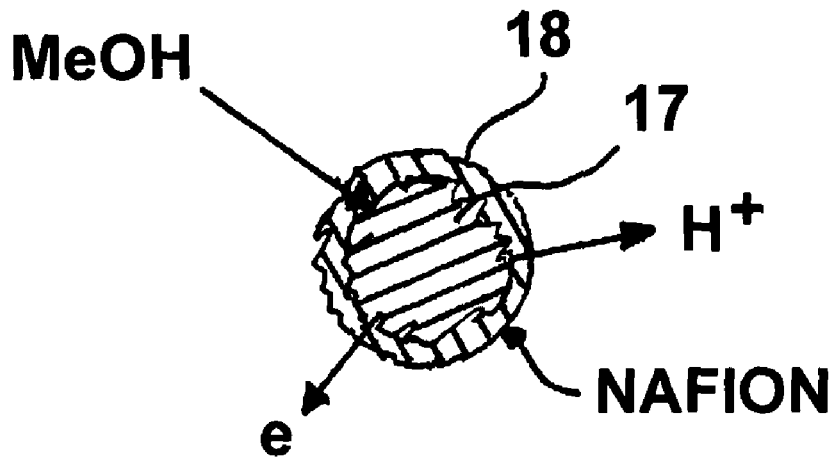
FIGS. 2A and 2B are diagrams showing a comparison in functionality between a catalyst particle of a conventional catalyst layer and a catalyst layer of this invention.

Catalyst inks are prepared by dispersing catalyst particles in a solubilized ionomer, which acts as a binder. In one method, the very thin film catalyst layers are transferred from decals consisting of TEFLON® (polytetrafluoroethylene) sheet with baked on catalyst ink. The binder must be stable and ionically (e.g. proton) conductive. Because conventional binders are not electronically conductive, requiring "electron tunneling" through the binder layer as shown in FIG. 2A, the electron path resistance increases with distance from the current collector. The ionic resistance also increases with distance from the NAFION/catalyst interface. Extending the electrolyte layer deeper into the catalyst layer minimizes the ionic resistance. Thus, even with adequate mass transport of reactant gas to the catalytic layer, a limiting factor is the transport of electrons from catalytic particles distant from the current collector.

Unlike a liquid electrolyte system, where the ionic charge transfer is easily attained at a three phase interface (the reactant gas, the solid catalyst and the liquid electrolyte), the three-phase reaction area in a proton exchange membrane fuel cell (PEMFC), also sometimes referred to herein as a polymer electrolyte membrane fuel cell, is very difficult to optimize and control because the electrolyte (NAFION®) is a solid phase. Therefore, the challenge is to obtain a continuum of the solid phase NAFION in the form of a very thin film of NAFION that contacts the metal catalyst without shielding the metal catalyst from the gaseous reactants. In addition, because NAFION itself is not a good electronic conductor, it is desirable to modify the portion around the catalyst particles to make it more electronically conductive.

FIG. 2(A) shows a conventional catalyst particle encased by a thin layer of binder that is proton conductive and not electronically conductive. The reactant gas passes through the thin ionomer layer and reacts on the catalyst particle surface. The product, $H^+$, migrates through the ionomer. However, when the catalyst particle is totally encased by the ionomer, the electron must tunnel through the electronically insulating ionomer. Thus, utilization of catalytic particles distant from the current collector is limited by the requirement for electron tunneling.

Figure 2B:
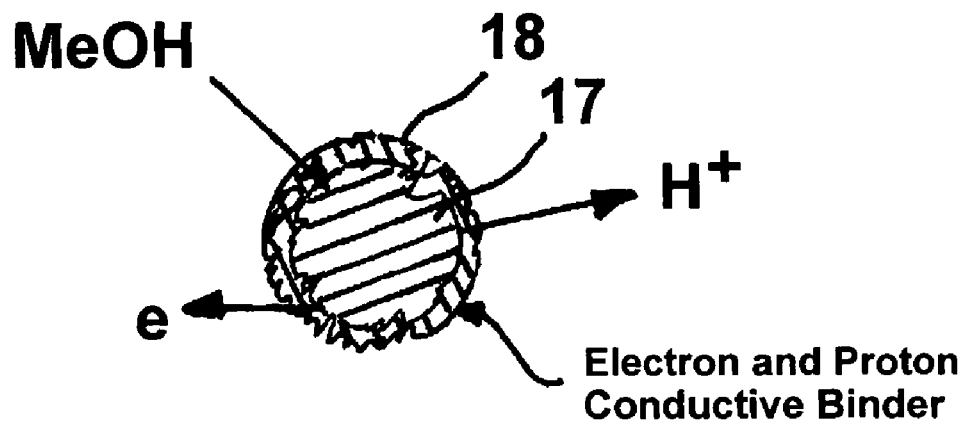

FIG. 2(B) shows that if an electron-conductive material is added to the thin catalyst layer in accordance with this invention, electron transport to the external circuit is facilitated. The proton and electron conductive construction of the catalytic layer improves the electron transfer from the catalyst surface to the current collector without resistance for proton transfer, thereby increasing the utilization efficiency of the catalyst.

In a conventional direct methanol fuel cell, methanol is oxidized at the anode catalyst surface to produce $CO_2$, protons, and electrons. However, methanol molecules also pass through the electrolyte membrane and react with oxygen at cathode side, which not only reduces the fuel efficiency (fuel lost at cathode), but also reduces the cell efficiency because the oxidation of methanol at the cathode produces a reverse potential in the cell. As shown in FIG. 1, for methanol crossover to the cathode to occur, the methanol must pass through the gas diffusion electrode layer 13, the anode catalyst layer 15, including binder material 18 and the electrolyte membrane 10, to reach the cathode catalyst layer 16. To prevent methanol from crossing over to the cathode catalyst layer, nothing can be done at the anode gas diffusion electrode because the anode catalysts need methanol to react. Consequently, only the anode catalyst layer and the electrolyte membrane are considered to provide effective means for stopping or reducing methanol pass through. As previously stated, numerous researchers are focusing on the electrolyte membrane with various approaches such as new membranes, modification of current membranes, and thicker membranes. So far, no promising results have been found in the modification and development of the electrolyte membranes.

I have discovered that modification of the anode catalyst layer in accordance with this invention reduces or effectively eliminates methanol flow into and/or through the electrolyte membrane. In particular, the presence of proton and electron conductive materials in the anode catalyst layer in accordance with this invention reduces methanol crossover through the electrolyte membrane and increases the catalyst efficiency and cell efficiency. The electron and proton conductive materials also provide the required stability under fuel cell operating conditions.

In accordance with one preferred embodiment of this invention, the proton conductive material comprises a derivative of an acid selected from the group consisting of sulfuric acid, phosphoric acid and mixtures thereof. As used herein, the term "derivative" means sulfur- or phosphorus-containing compounds or materials resulting from the reaction of compounds or materials with sulfuric acid and/or phosphoric acid. In accordance with a more preferred embodiment, the derivative is selected from the group consisting of sulfonates, phosphonates, sulfonic acids, phosphonic acids and mixtures thereof. In accordance with an even more preferred embodiment, the proton conductive material is selected from the group consisting of ligno-sulfonic acid, para-toluene sulfonic acid and mixtures thereof.

The electron conductive material in accordance with one embodiment of this invention comprises at least one electropolymerized ionomer. Suitable ionomers may be selected from the group consisting of aniline, pyrrole, azulene and mixtures thereof. Electropolymerized ionomers, such as polypyrrole, polyaniline, and polyazulene, are widely used in battery development as electrode materials. These polymers can also be dissolved in organic solvents to become useful binders. The electron conductive polymer can also be sulfonated or grafted with other proton conductive polymers to become proton conductive.

In accordance with one preferred embodiment of this invention, the electron conductive material comprises a grafted polymer. In accordance with a more preferred embodiment of this invention, the electron conductive polymer is grafted to a proton conductive polymer. In accordance with yet another preferred embodiment, the grafted polymer comprises polyaniline grafted to lignin.

EXAMPLE

Figure 3:
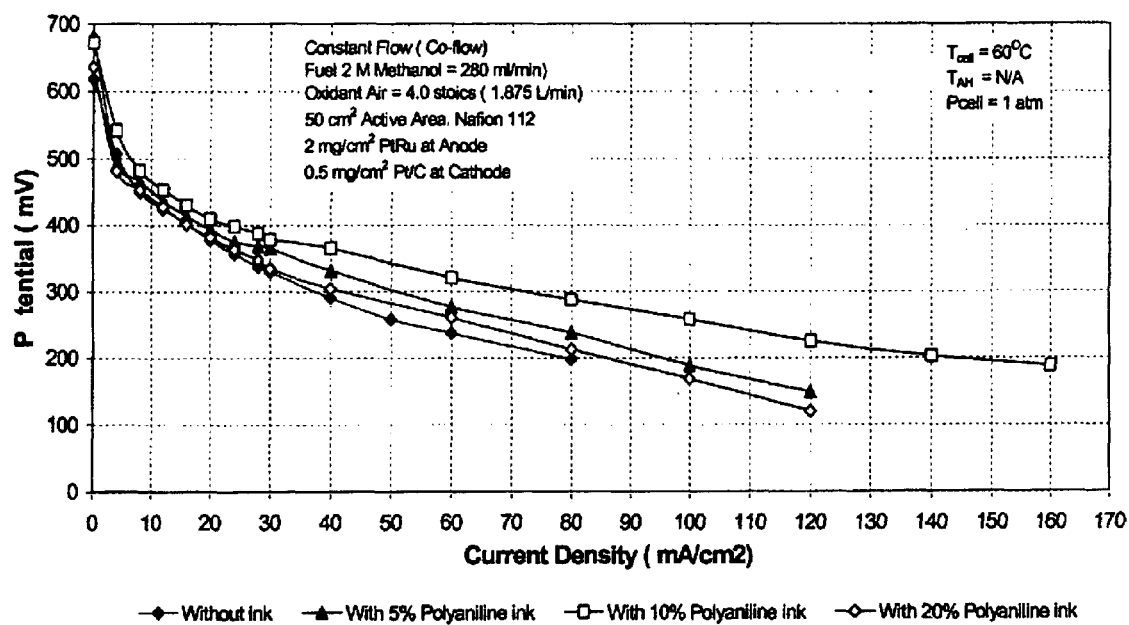
FIG. 3 is a diagram showing the performance of direct methanol fuel cells employing this invention compared to conventional direct methanol fuel cells.

Anode catalyst, PtRu (1:1), was purchased from Johnson Matthey. The catalyst was mixed with an amount of water and isopropanol (1:1) sufficient to wet the catalyst. Then a 20% by weight portion of a 5% NAFION emulsion (DuPont) was mixed with the wetted catalyst. Thereafter, a 10% by weight portion of polyaniline (emeraldine salt), long chain grafted to lignin (Sigma-Aldrich), was mixed with the anode catalyst, resulting in formation of a catalyst ink. After stirring for two hours, the ink was ready to apply to the electrolyte membrane or gas diffusion electrodes. As shown in FIG. 3, the performance of a direct methanol fuel cell employing in the range of about 5 wt. % to about 20 wt. % polyaniline catalyst ink is improved over a conventional cell operating without the benefit of this invention. Also as shown, the best performance is obtained using about 10 wt. % polyaniline ink.

Also disclosed herein is a method for reducing or substantially eliminating methanol crossover from the anode to the cathode of a direct methanol fuel cell and for increasing catalyst efficiency. In accordance with this method, a catalyst ink comprising an electron conductive material and a proton conductive material is applied either to the electrolyte facing surface of the anode electrode or the anode electrode facing surface of the proton exchange membrane electrolyte.

Figure 5:
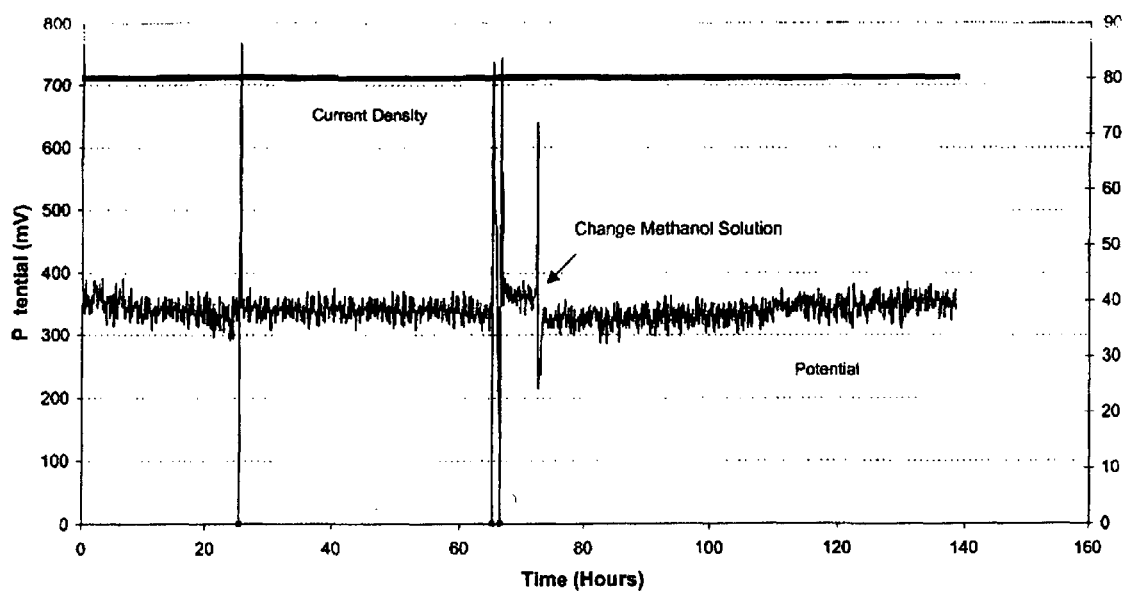
FIG. 5 is a diagram showing the stability of a direct methanol fuel cell employing the claimed invention.

In accordance with one preferred embodiment, the ink used to produce the catalyst layer contains ligno-sulfonic acid and para-toluene sulfonic acid as dopants. The sulfonic acid in the polymer enables proton conductivity. Polyaniline is employed as an electron conductor, which enables the electrons from methanol oxidation to transfer to the external circuit. This ink is very corrosion resistant as well as being a very good adhesive, which enables binding of the catalysts together. This ink is also very stable under oxidation and reduction conditions because the ink contains a grafted polymer. The ink improves the catalytic efficiency because the ink is both electron and proton conductive, thereby reducing the restriction on the transport of the methanol reaction products to an external circuit and through the electrolyte membrane. Any other electron conductive polymer can be also applied in this concept. Evidence of the stability of a direct methanol fuel cell employing the anode catalyst layer in accordance with this invention is shown in FIG. 5.

Figure 4:
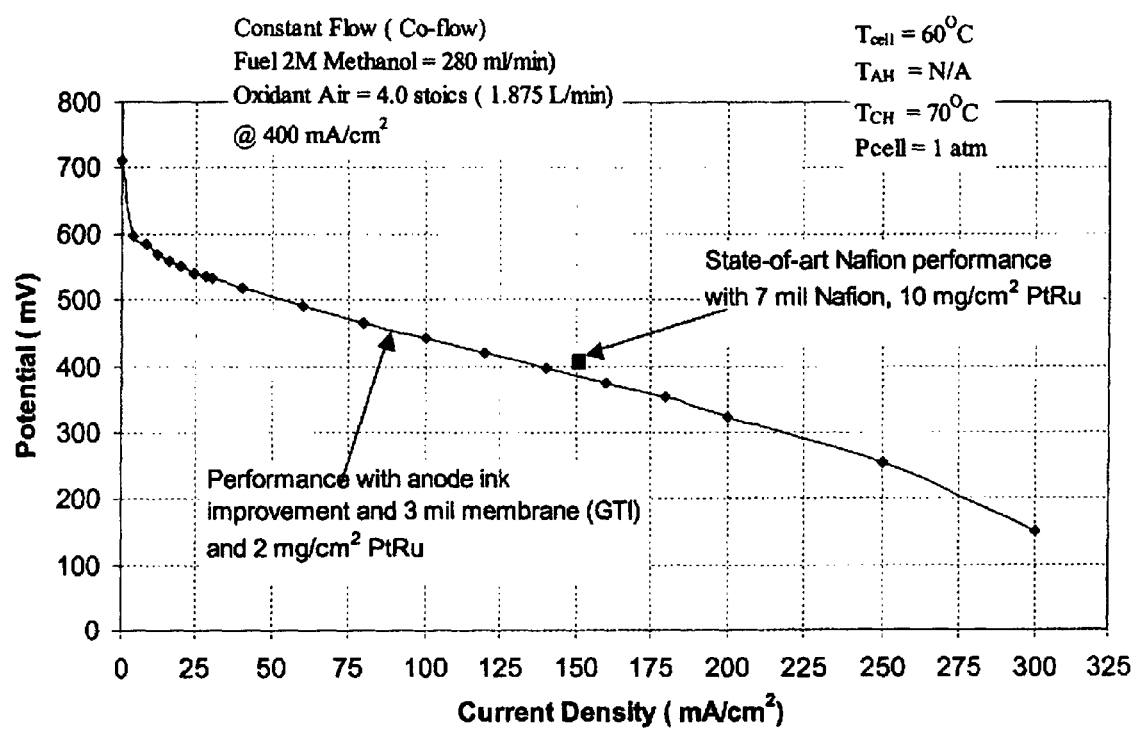
FIG. 4 is a diagram showing a comparison between the performance of a direct methanol fuel cell with 10% ink in the anode catalyst layer in accordance with one embodiment of this invention and a conventional direct methanol fuel cell employing a NAFION binder material.

A further benefit of this invention is that it enables the use of thinner proton exchange membranes and lesser amounts of catalyst. As shown in FIG. 4, the performance of a direct methanol fuel cell employing the electron conductive and proton conductive binder in the catalyst layer in accordance with this invention is nearly the same as a state-of-the-art cell employing a NAFION binder. Also as shown therein, the thickness of the proton exchange membrane in the state-of-the-art fuel cell is more than 100% greater than the thickness of the membrane of the fuel cell in accordance with one embodiment of this invention. Suitable proton exchange membranes for use in the fuel cell of this invention may have a thickness of less than about 5 mils. Likewise, employment of the catalyst ink of this invention in the anode catalyst layer enables an 80% reduction in the amount of catalyst material required compared to the state-of-the-art fuel cell, all the while maintaining a level of performance comparable to the performance of the state-of-the-art fuel cell. In particular, PtRu catalysts in an amount less than about 5 mg/cm$^2$ may be employed compared to the 10 mg/cm$^2$ PtRu employed in conventional direct methanol fuel cells.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

I claim:

1. In a fuel cell comprising an anode electrode, a cathode electrode and a proton exchange membrane electrolyte disposed there between, the improvement comprising:
an anode catalyst layer disposed on one of an electrolyte facing surface of said anode electrode and an anode electrode facing surface of said electrolyte, said anode catalyst layer comprising a proton conductive material and an electron conductive material substantially uniformly dispersed throughout said catalyst layer, at least one of said proton conductive material and said electron conductive material comprising lignin.

2. A fuel cell in accordance with claim 1, wherein said proton conductive material comprises a derivative of an acid selected from the group consisting of sulfuric acid, phosphoric acid and mixtures thereof.

3. A fuel cell in accordance with claim 2, wherein said derivative is selected from the group consisting of sulfonates, phosphonates, sulfonic acids, phosphonic acids and mixtures thereof.

4. A fuel cell in accordance with claim 3, wherein said proton conductive material is selected from the group consisting of ligno-sulfonic acid, para-toluene sulfonic acid and mixtures thereof.

5. A fuel cell in accordance with claim 1, wherein said electron conductive material comprises at least one electropolymerized ionomer.

6. A fuel cell in accordance with claim 5, wherein said ionomer is selected from the group consisting of aniline, pyrrole, azulene and mixtures thereof.

7. A fuel cell in accordance with claim 1, wherein said electron conductive material comprises an ionomer selected from the group consisting of aniline, pyrrole, azulene and mixtures thereof.

8. A fuel cell in accordance with claim 1, wherein said electron conductive material comprises a grafted polymer.

9. A fuel cell in accordance with claim 8, wherein said grafted polymer comprises polyaniline grafted to said lignin.

10. A fuel cell in accordance with claim 1, wherein said electron conductive material is grafted with said proton conductive material.

11. A fuel cell in accordance with claim 1, wherein said electron conductive material is at least one of sulfonated and phosphonated.

12. A fuel cell in accordance with claim 1, wherein said proton exchange membrane electrolyte has a thickness of less than about 4 mils.

13. A fuel cell in accordance with claim 1, wherein said anode catalyst layer comprises a PtRu catalyst material in an amount of less than about 5 mg/cm$^2$.

14. A fuel cell in accordance with claim 1, wherein said electron conductive material comprises in a range of about 5% by weight to about 20% by weight of said anode catalyst layer.

15. In a direct methanol fuel cell comprising an anode electrode, a cathode electrode and a proton exchange membrane electrolyte disposed there between, the improvement comprising:

an anode catalyst layer disposed on one of an electrolyte facing surface of said anode electrode and an anode electrode facing surface of said electrolyte, said anode catalyst layer comprising a proton conductive material and an electron conductive material substantially uniformly dispersed throughout said catalyst layer, at least one of said proton conductive material and said electron conductive material comprising lignin.

* * * * *